Dec. 31, 1935.  S. APOSTOLOFF  2,026,205
AUTOMATIC SAFETY SEAL BATTERY CELL
Filed July 18, 1931  2 Sheets-Sheet 1

INVENTOR
SERGIUS APOSTOLOFF
BY
ATTORNEY

Dec. 31, 1935.  S. APOSTOLOFF  2,026,205
AUTOMATIC SAFETY SEAL BATTERY CELL
Filed July 18, 1931   2 Sheets-Sheet 2

INVENTOR
SERGIUS APOSTOLOFF
BY
ATTORNEY

Patented Dec. 31, 1935

2,026,205

UNITED STATES PATENT OFFICE 2,026,205

AUTOMATIC SAFETY SEAL BATTERY CELL

Sergius Apostoloff, Brooklyn, N. Y.

Application July 18, 1931, Serial No. 551,658

2 Claims. (Cl. 136—113)

This invention relates to battery cells.

An object of the invention is to produce an improved cell of the type in which the form is cylindrical and the active connections are located so that the anode and cathode respectively are at opposite ends of the cylinder.

A further object of the invention is to produce a construction of this general type in which the activating electrolyte is maintained hermetically sealed during the inactive period before it is desired to put the cell into use.

A further object of the invention is to produce a cell of the above character which, before the active period, may be subjected to the excessive heat incident to transportation to the tropics and at the same time automatically insures, upon the placing of the cell into active condition, that the chemically active elements be substantially sealed, while at the same time, an additional safety seal is provided against the creepage of salts.

A further object of the invention is to make possible an increase in the area of active surfaces of the electrodes without endangering internal short circuit.

In general, it is an object to simplify, cheapen, render more durable and more efficient a battery cell comprising a zinc cup enclosing a cathode bobbin.

The above will be pointed out more particularly in the accompanying claims which are directed to an illustrative embodiment of the invention solely for purposes of illustration and not limitation. This illustrative embodiment of the invention is described in the following specification in connection with the accompanying drawings which form a part hereof.

Figure 1:
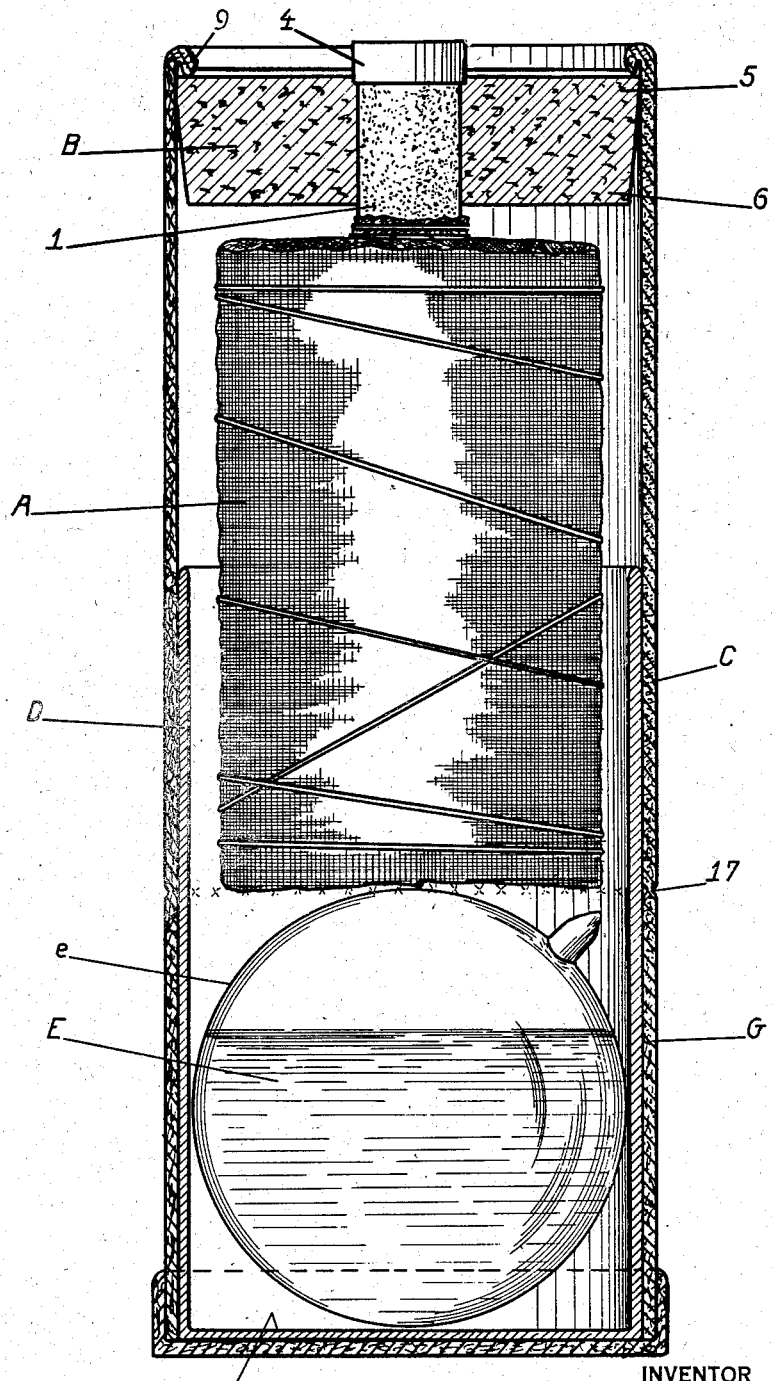
Figure 2:
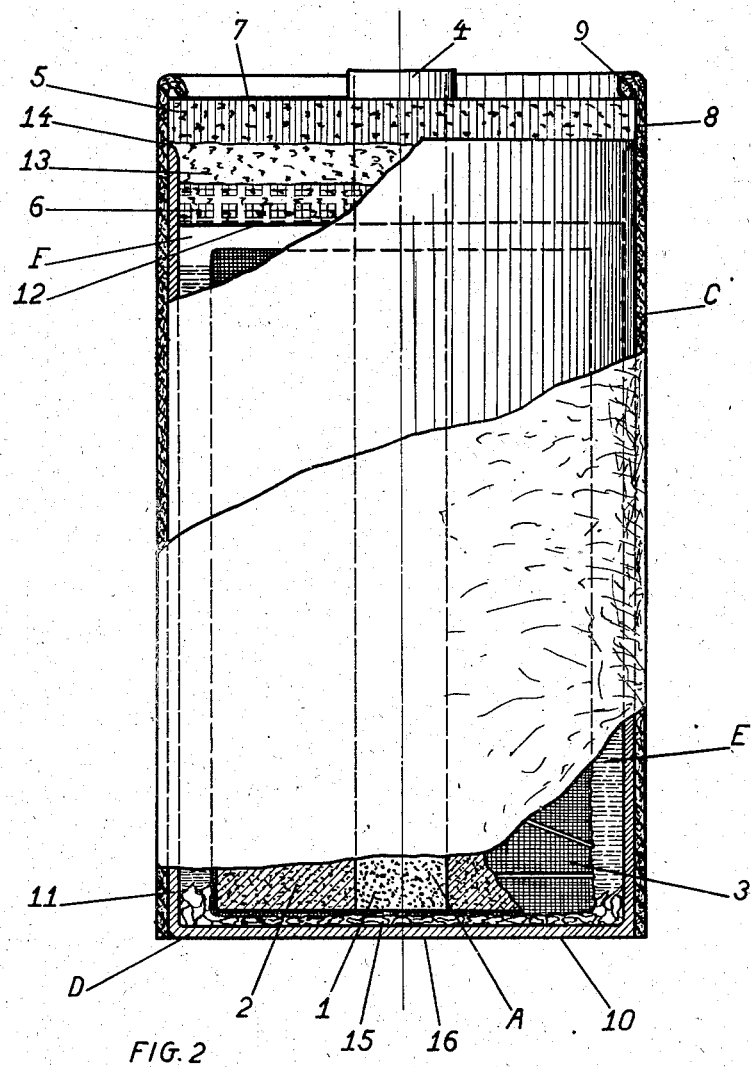

In the drawings, Fig. 1 is a vertical section with parts shown in elevation of an embodiment of the cell in its inactive condition ready for shipping and shelf life; and Fig. 2 is a similar view of the same embodiment rendered active and ready for use.

The cathode A comprises a central carbon rod 1 axially positioned within a mass 2 of any suitable depolarizing material held in place by a wrapping 3 of textile fabric and thread so as to form a bobbin. In my construction, I find it expedient to extend the carbon rod 1 down all the way through the bobbin flush with the bottom plane surface of the structure. The terminal for the cathode is preferably in the form of a brass cap 4 clamped about the top end of the carbon rod 1 which is gripped in an axial perforation extending through the cork stopper B. An outer shell C of insulating fibrous material such as thick paper is firmly sealed and secured at its top rim to the top rim portion of the stopper B.

In the construction shown, the top rim portion 5 of the disk-shaped stopper B is of larger diameter than the bottom rim portion 6. It is preferred that the top face 7 and the top rim portion 5 be coated with a water-proof insulating cement of a character which not only enters into the pores of the cork stopper but will enter into and combine with the fibrous shell C to form a seal all about the top rim of the stopper B which is absolutely impervious to the creepage of salts such as zinc salts. It is preferred that a crimp 9 of the top rim of the outer shell C of fibrous material be made and inturned into direct contact with the top face of the stopper B so that great mechanical combining strength is provided. This strong unyielding closure between the top rim 5 of the cork B and the inner top rim of the outer shell C of fibrous material forms the safety seal against the creepage of zinc salts. The salts tend to creep only along the surface of zinc. When they come to a surface of material, like paper, or cork, there is no dragging or creeping action and to traverse such a surface they must be pushed along from the rear. Even though there is no cementing material between the top rim of the cork and the inner top portion of the paper shell C, the positive gripping of the crimp 9 holds the cork in intimate, unyielding contact cork to paper in such a way as to prevent the passage of zinc salts up across the top surface 7 to short-circuit with the electrode 4.

Within the outer shell C is a cylindrical zinc cup D, the bottom 10 of which is preferably in the plane of the bottom end of the shell C. The axial or vertical extent of the cylindrical portion 11 of the cup D is essentially less than that of the outer shell C. It is preferred that the bottom rim portion 6 of the stopper B be coated with a sealing compound, such as pure casein, which extends over the bottom surface 12 of the stopper B and which may coat the wall of the central perforation through which the carbon rod 1 extends. It is also preferred that the central rim portion 13 of the cork stopper B be left uncoated in its natural state and that the axial extent of the cylindrical portion 11 be so limited that the upper rim 14 of this cylindrical portion terminates below the coated top rim portion 5. The axial extent of the fibrous shell C terminating at the edge 17 for the active condition of the cell prevents the cylindrical portion 11 of the zinc cup D being pushed up between the cork B and the inner wall of the shell C farther than just below the safety seal 5. An additional protection against being thrust up farther is the mechanical connection of the bottom of the cup D through the broken glass 15 with the electrode construction A. Thus, any axial compression between the terminal 4 and the bottom 10 of the cup is resisted internally of the cell. By this construction, a separate and distinct seal of the part 12 to the inner wall of the zinc is effected and a separate complete seal between the top rim portion 5 and the inner wall of the outer shell of fibrous material is made. By this construction, the top rim of the zinc cup, which is forced about the bottom rim of the stopper, is able to make a tight, substantially hermetical seal with the stopper without disturbing the safety seal between the fibrous shell C and the top rim of the stopper. This is of great importance in absolutely preventing the creepage of salts across the top of the stopper to the terminal 4.

In its preferred embodiment, the crimp 9 is also cooperative in taking and sustaining the mechanical stress due to the assembling of the stopper into the mouth of the zinc cup.

In its active form, the electrolyte paste E is positioned between the bobbin A and the inner wall of the cup D and between the bottom of the bobbin and the bottom of the cup D. In addition, fractured glass flakes 15 are positioned between the bottom end of the carbon rod 1 and the bottom 10 of the zinc cup positively preventing short circuiting of this rod to the zinc cup. An ample expansion chamber F is provided beneath the lower surface 12 of the stopper B.

Before it is brought into an active state ready for use, it is preferred that the electrolyte E, preferably existing in the form of an electrolyte paste such as I have described in my previous patents, be contained in a frangible hermetically sealed glass ampul e occupying T space between the bottom of the bobbin A and the bottom 10 of the zinc cup. The zinc cup, not having been forced home to insure that the cell be safely maintained in this inactive condition, it is preferred that a downward extension G of the shell C be provided. This downward extension is shown in the form of a cylindrical paper or fibrous material cup weakly connected about the circle 17 to the bottom rim of the shell C so that a twist will sever it. When this cup G is removed, the application of force between the top end of the shell C and the outside of the bottom 10 shatters the glass ampul and forces the parts from the relative state shown in Fig. 1 into the state shown in Fig. 2 when the cell is ready for use.

Emphasis is laid upon the fact that no part of the anode projects into the plane of the terminal 4, that a safety seal between the shell C and the stopper B is maintained, although provision is made for the automatic sealing or stoppering of the zinc cup at the time that the ampul is crushed. The anode terminal of this cell is the bottom face 16 of the zinc cup.

What I claim and desire to secure by United States Letters Patent is:

1. A dry cell of the type adapted to remain inactive until it is desired to put the cell into use comprising a cathode including a central carbon rod and a coaxial bobbin of depolarizing compound attached to said rod; an outer cylindrical shell of insulating fibrous material; a non-meltable stopper of insulating, somewhat resilient, impervious material, disk-shaped and of larger diameter at its top rim than at its bottom rim; cementitious means forming a tight union mechanically reinforced against relative movement between the top rim of said stopper and the inner top rim of said outer cylindrical shell to form a safety seal impervious all around the top rim of said stopper to the creepage of salts; said stopper having a central axial perforation embracing said central carbon rod and, by gripping said carbon rod, to position said cathode axially of said outer shell; a cylindrical zinc cup of less axial extent than and snugly telescoping within said outer shell, with its inner top rim adapted to engage the bottom rim of said stopper between it and the inner surface of said outer shell; a frangible sealed ampul of thin walled glass having an interior charge of electrolyte paste, said ampul being positioned between the bottom of said bobbin and the bottom of said zinc cup, whereby a telescoping movement of said cylindrical zinc cup within said outer shell forces said electrolyte paste into operative position and broken wall portions of said ampul are imprisoned between the end of said bobbin and said zinc cup to serve as an insulating spacer for said carbon rod.

2. A dry cell of the type adapted to remain inactive until it is desired to put the cell into use comprising a cathode including a central carbon rod and a coaxial bobbin of depolarizing compound attached to said rod; an outer cylindrical shell of insulating fibrous material; a non-meltable stopper of insulating, somewhat resilient, impervious material, disk-shaped and of larger diameter at its top rim than at its bottom rim; cementitious means forming a tight union mechanically reinforced against relative movement between the top rim of said stopper and the inner top rim of said outer cylindrical shell to form a safety seal impervious all around the top rim of said stopper to the creepage of salts; said stopper having a central axial perforation embracing said central carbon rod and, by gripping said carbon rod, to position said cathode axially of said outer shell; a cylindrical zinc cup of less axial extent than and snugly telescoping within said outer shell, with its inner top rim adapted to engage the bottom rim of said stopper between it and the inner surface of said outer shell; a frangible sealed ampul of thin walled glass having an interior charge of electrolyte paste, said ampul being positioned between the bottom of said bobbin and the bottom of said zinc cup, whereby a telescoping movement of said cylindrical zinc cup within said outer shell forces said electrolyte paste into operative position and broken wall portions of said ampul are imprisoned between the end of said bobbin and said zinc cup to serve as an insulating spacer for said carbon rod; a cup-shaped protective extension removably secured to the bottom rim of said outer cylindrical shell and adapted to protect the parts and prevent the crushing of said ampul during the inactive life of said cell.

SERGIUS APOSTOLOFF.